United States Patent
Wood et al.

(10) Patent No.: US 9,595,400 B2
(45) Date of Patent: Mar. 14, 2017

(54) SUPERCAPACITOR HAVING IMPROVED CONDUCTIVITY PROPERTIES AND METHOD OF MANUFACTURE

(71) Applicant: Lockheed Martin Corporation, Bethesda, MD (US)

(72) Inventors: John Arthur Wood, Bethlehem, PA (US); Rebecca Schwartz, Chester Springs, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 206 days.

(21) Appl. No.: 14/457,723

(22) Filed: Aug. 12, 2014

(65) Prior Publication Data

US 2015/0332870 A1 Nov. 19, 2015

Related U.S. Application Data

(60) Provisional application No. 61/993,113, filed on May 14, 2014.

(51) Int. Cl.

| | |
|---|---|
| *H01G 11/68* | (2013.01) |
| *H01G 11/70* | (2013.01) |
| *H01G 11/86* | (2013.01) |
| *H01G 11/28* | (2013.01) |
| *B82Y 99/00* | (2011.01) |

(52) U.S. Cl.
CPC ............ *H01G 11/68* (2013.01); *H01G 11/28* (2013.01); *H01G 11/70* (2013.01); *H01G 11/86* (2013.01); *B82Y 99/00* (2013.01); *Y10S 977/948* (2013.01); *Y10T 29/42* (2015.01)

(58) Field of Classification Search
None
See application file for complete search history.

(56) References Cited

U.S. PATENT DOCUMENTS

| | | | |
|---|---|---|---|
| 2013/0252089 A1* | 9/2013 | Kuriki | H01G 11/04 429/211 |
| 2014/0212760 A1* | 7/2014 | Zhao | H01M 4/0419 429/231.8 |
| 2014/0254065 A1* | 9/2014 | Rustomji | H01G 11/82 361/502 |
| 2015/0104714 A1* | 4/2015 | Galande | H01M 4/13 429/233 |

* cited by examiner

*Primary Examiner* — Dion R Ferguson
(74) *Attorney, Agent, or Firm* — Oblon, McClelland, Maier & Neustadt, L.L.P.

(57) ABSTRACT

An improved supercapacitor includes a first and second electrode with each electrode made at least in part from a highly-porous electrically conductive material, a insulative separator separating the electrodes; a first electrically conductive current collector in physical and electrical contact with the first electrode; and a second electrically conductive current collector in physical and electrical contact with the second electrode, wherein at least one current collector is configured to have multiple separate portions with each portion having a current capacity that varies as a function of current passing through during capacitive operation.

16 Claims, 9 Drawing Sheets

(CROSS-SECTIONAL VIEW)

(CROSS-SECTIONAL VIEW)

(TOP VIEW)

(SIDE VIEW)

130S (TOP VIEW)

US 9,595,400 B2

SUPERCAPACITOR HAVING IMPROVED CONDUCTIVITY PROPERTIES AND METHOD OF MANUFACTURE

BACKGROUND

Supercapacitors are a relatively recent development in the search for a viable replacement for chemical batteries. They are capable of exhibiting high-energy capacitance and high-current density discharge. Supercapacitors incorporate very high surface area elements and very thin insulators between conductive elements. Advantages of supercapacitors over batteries include: 1) supercapacitors can provide much higher output currents than batteries, 2) supercapacitors can be recharged much faster than batteries, and 3) supercapacitors can endure many more discharge/charge cycles than batteries. However, supercapacitors have not yet reached their potential capabilities because of two factors: 1) they are often limited in the voltage they can endure, and 2) they are limited in their rate of discharge and charge by internal heating.

SUMMARY

Various aspects and embodiments of the invention are described in further detail below.

In an embodiment, a supercapacitor includes a first and second electrode with each electrode made at least in part from a material incorporating a high surface area, an insulative separator separating the electrodes, a first electrically conductive current collector in physical and electrical contact with the first electrode, and a second electrically conductive current collector in physical and electrical contact with the second electrode, wherein at least one current collector is configured to have multiple separate portions with each portion having a current capacity that varies as a function of current passing through that portion during capacitive operation.

In another embodiment, a method for manufacturing a supercapacitor includes placing or forming a first and second electrode in physical contact on opposite sides of a flat insulative separator such that the insulative separator electrically separates the electrodes, wherein each electrode made at least in part from a high surface-area material, causing a first electrically conductive current collector to be in physical and electrical contact with the first electrode, and causing a second electrically conductive current collector to be in physical and electrical contact with the second electrode, wherein at least one current collector is configured to have multiple separate portions with each portion having a current capacity that varies as a function of current passing through that portion during capacitive operation.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

This disclosure provides a structure that is designed to minimize the heat generated by passing high levels of electrical current into and out of the supercapacitor. An analog to the architecture is the bare trees outside during the winter. You can see the thick trunk—analogous to the main feed wire entering the supercapacitor—and the ever thinning series of branches leading to the twigs that supported the leaves (analogous to the high surface area elements of the supercapacitor). Another example that may help in understanding how this works is your own lungs. It takes a lot of pressure to force air at a high rate through small diameter tubes. However, the branching structure of the lungs allows you do deliver air to the very small diameter portions of the lung, where gas exchange takes place, and it takes very little effort to move a large volume of air quickly when this architecture is used.

Figure 1A:
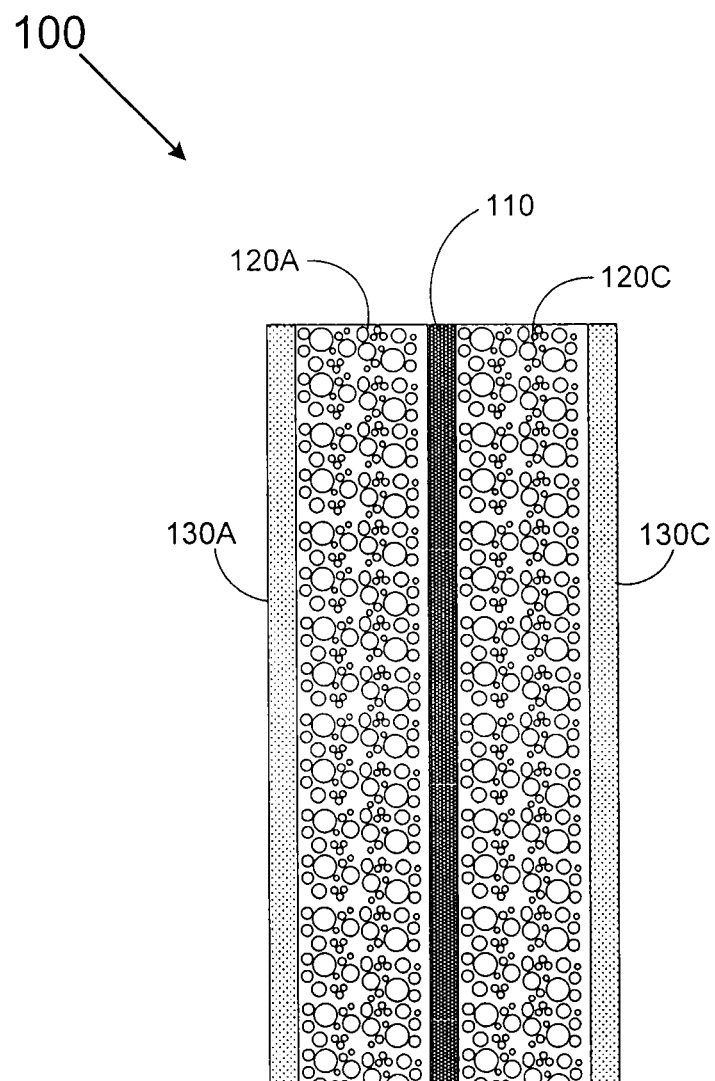
FIGS. 1A and 1B depict cross-sectional views of two different supercapacitor configurations.

FIG. 1A depicts a cross-sectional view of a configuration of a supercapacitor 100. As shown in FIG. 1A, the supercapacitor 100 includes an insulative separator 110 that separates and electrically insulates a first electrode 120A (e.g., an anode) and a second electrode (e.g., a cathode). Depending on the intended application, the insulative separator 110 may or may not also have dielectric properties. A first electrically conductive current collector 130A is in physical and electrical contact with the first electrode 120A, and a second electrically conductive current collector 130C is in physical and electrical contact with the second electrode 120C.

The insulative separator 110 of FIG. 1 is a microporous thermoplastic having an dielectric material filling the pores of the thermoplastic. However, the particular composition of the insulative separator 110 can change from embodiment to embodiment as long as the basic requirements of superconductor separators are met. As such separators are well known and understood in the relevant arts it is not necessary to describe all possible suitable materials. Also as a general rule, the thinner the separator, the more capacity there is to store electricity, but the lower the breakdown voltage and higher the leak rate. The power than can be stored in a capacitor varies as the square of the voltage, which favors a thick, very insulative separator. However, a thin dielectric insulator allows storage of more total electrons/holes. The specific use intended for the supercapacitor accordingly determines the most appropriate compromises.

The first electrode 120A and the second electrode 120C are both made, at least in part, from a carbonaceous material incorporating a high surface area. However, in alternative embodiments the first electrode 120A and the second electrode 120C may take the form of porous ruthenium oxide, carbon composites or any other known or later-developed suitable electrically conductive materials capable of providing a high surface area.

In a variant of this embodiment, the current collectors 130A and 130C, the insulative separator 110 and the electrodes 120A and 120C can be arranged in a concentric pattern as will be shown below with respect to FIGS. 3A-3C. In the case of a concentric configuration, the cross-sectional area of the current collectors 130A and 130C can be proportional to the current, unless the capacitor is operating in a very high frequency regime, in which case the external perimeter would be better configured as proportional to the current.

The first current collector 130A and the second current collector 130C are both made of a combination of a conductive metal and carbon nanotubes as will be explained in greater detail below. However, in alternative embodiments the conductive metal may be replaced with any number of conductive materials, including a structure composed of any combination of metals, carbon-based materials, and so on.

Figure 1B:
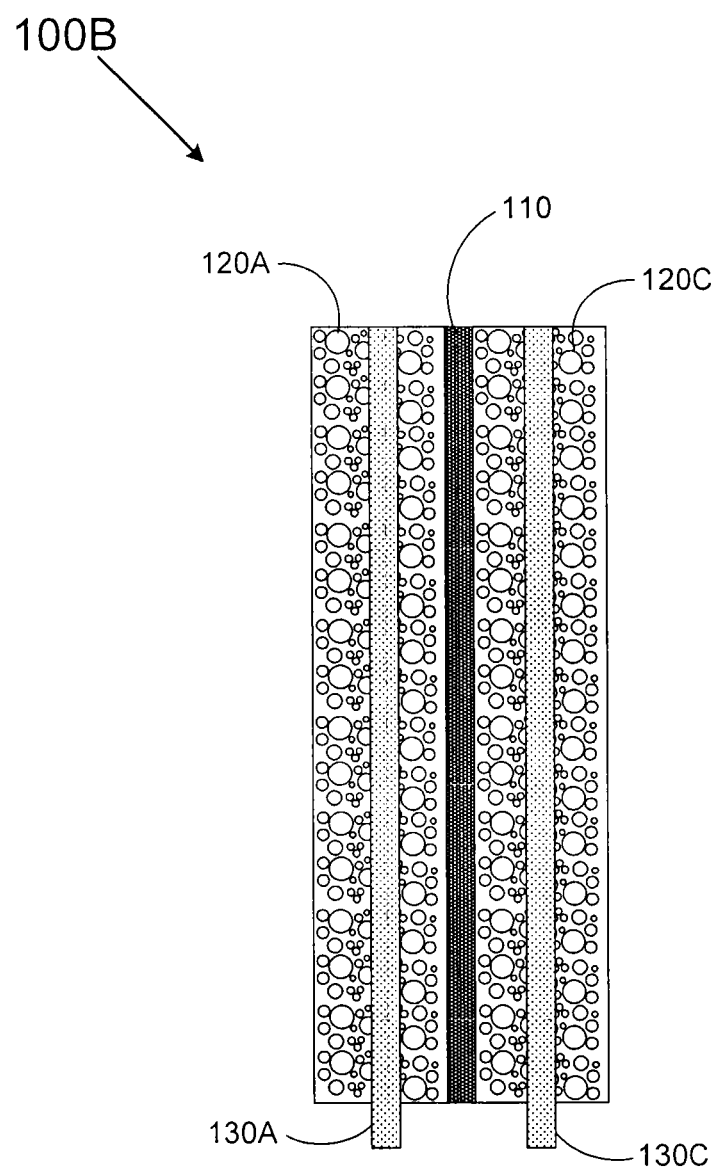

FIG. 1B depicts a second supercapacitor 100B, which is a variation of the supercapacitor 100 of FIG. 1. As shown in FIG. 1B, the second supercapacitor 100B differs from the example in FIG. 1A in that the current collectors 130A and 130C are buried/immersed within their respective electrodes 120A and 120C. Whether or not the current collectors 130A and 130C are to rest against an electrode (as per FIG. 1A) or be immersed in an electrode (as per FIG. 1B) can vary based on the physical structure of the current collectors 130A and 130C. For example, if the current collectors 130A and 130C are continuous metal sheets, it would serve no purpose to bury the current collectors 130A and 130C within an electrode. However, in other embodiments where the current collectors 130A and 130C are not continuous, burying the current collectors 130A and 130C may be a better option.

Figure 2:
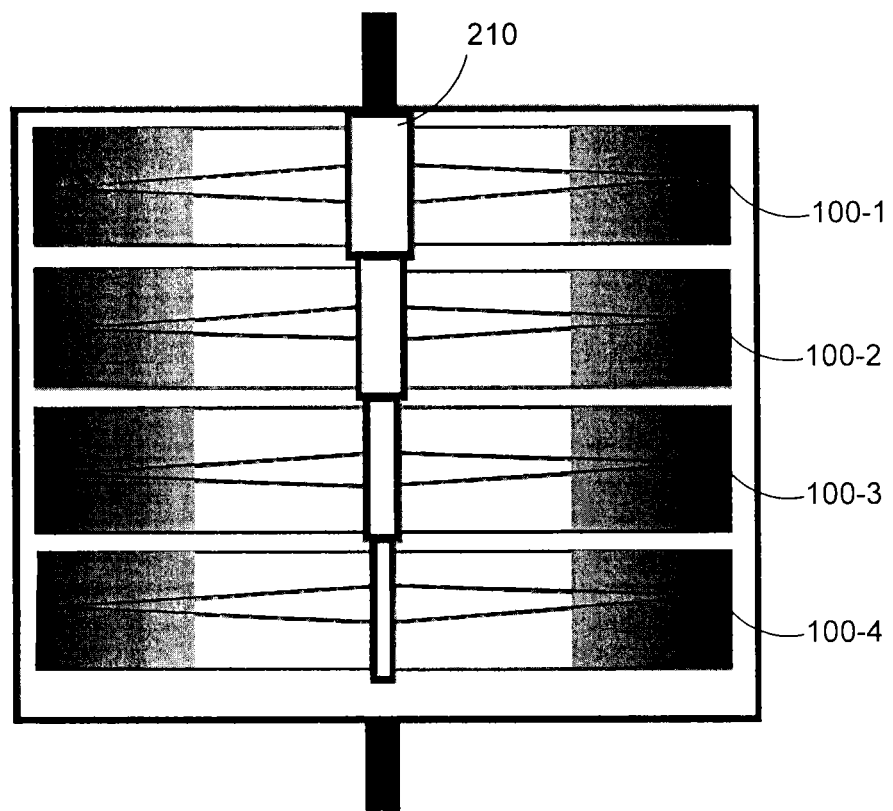
FIG. 2 depicts a plurality of supercapacitor devices stacked upon one another in a common package.

FIG. 2 depicts a stacked array of separate superconductors 100-1, 100-2, 1003 and 100-4 connected by a common conductive bus 210. As shown in FIG. 2, the width of the common conductive bus 210 varies in thickness. This is to allow for greater current capacity and lower resistance of the device as a whole, and as a general rule, the thickness of the common conductive bus 210 varies as a function of current passing through each portion during capacitive operation, i.e., charging or discharging. The more instantaneous current passing through a location, the greater the thickness of the conductive bus 210 at that location as compared to other locations.

Figure 3A:
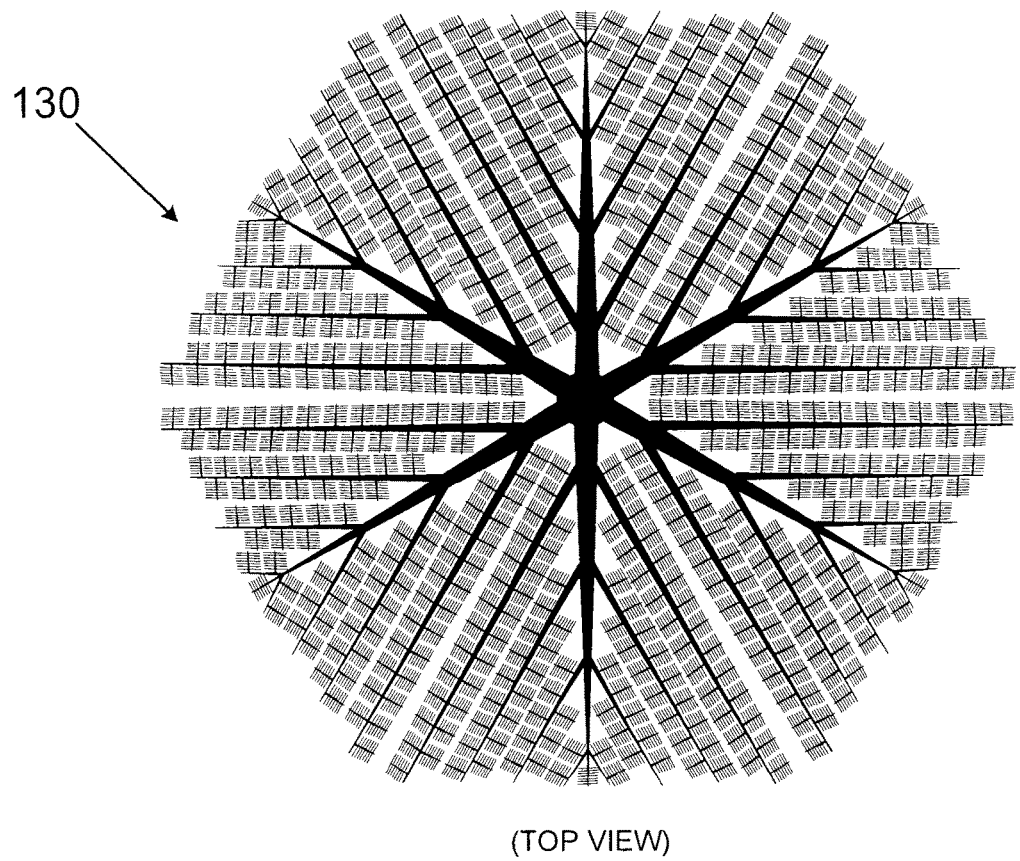
FIG. 3A depicts a branched architecture for a current collector.
Figure 3A:

FIG. 3A depicts a branched architecture 130 for a current collector. As can be seen in FIG. 3B, the branched architecture is an interconnected branched topology of progressively smaller branches. Each branch will have a current capacity that varies as a function of (e.g., may be directly proportional to) current passing through the branch during capacitive operation. At extremities where current is to be smallest, branch thickness (and thus current capacity) will be smallest. As branches meet and currents combine, current will be greater and so branch thickness will increase as a function of the increased current load. The thickness of a branch can vary either solely in the plane of a current collector, vary in thickness tangential to the plane of a current collector, or in both dimensions. FIG. 3B depicts a segment 130S of the branched architecture of FIG. 3, and is provided to show that a branched architecture can extend to many different levels of branches.

Figure 3B:
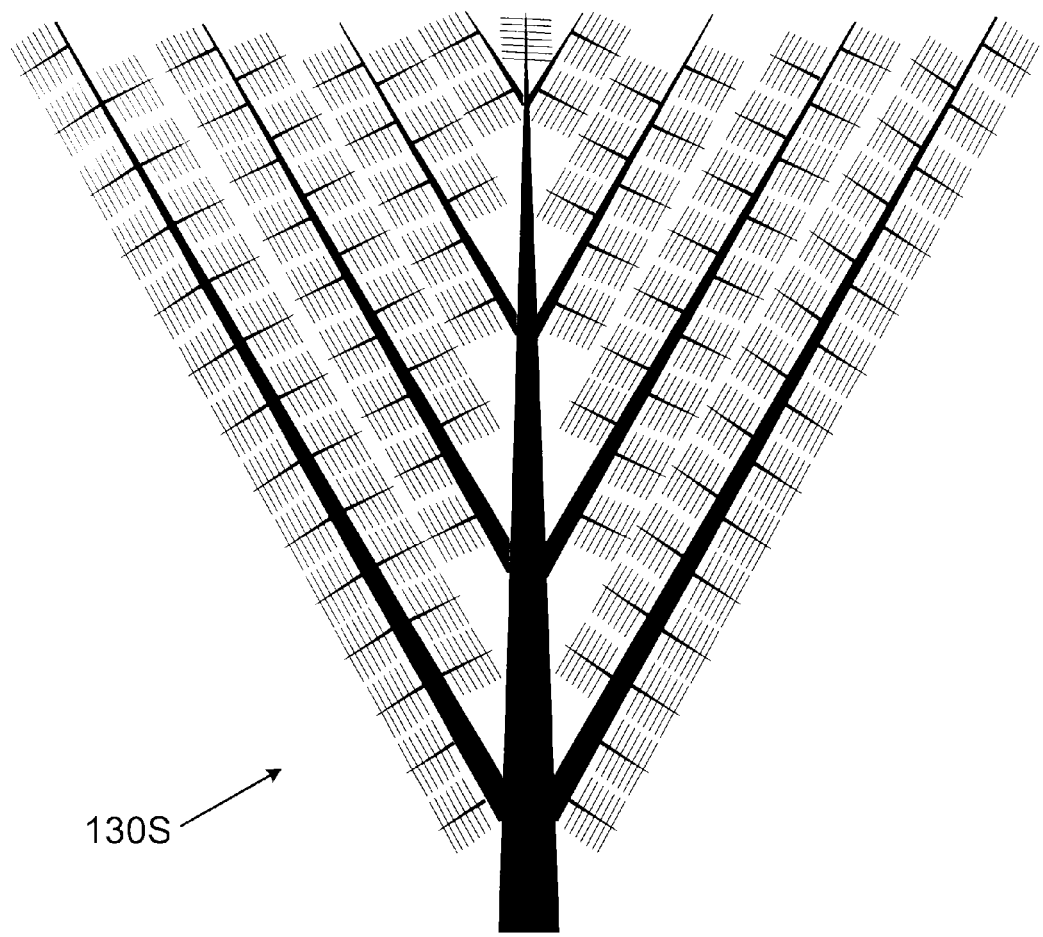
FIG. 3B depicts a segment of the branched architecture of FIG. 3A.

Assuming a flat architecture, the branched architecture 130 of FIGS. 3A-3B provides a high surface area and is particularly suitable to be buried within an electrode (per FIG. 1B) so as to take advantage of the high surface area.

Figure 3C:
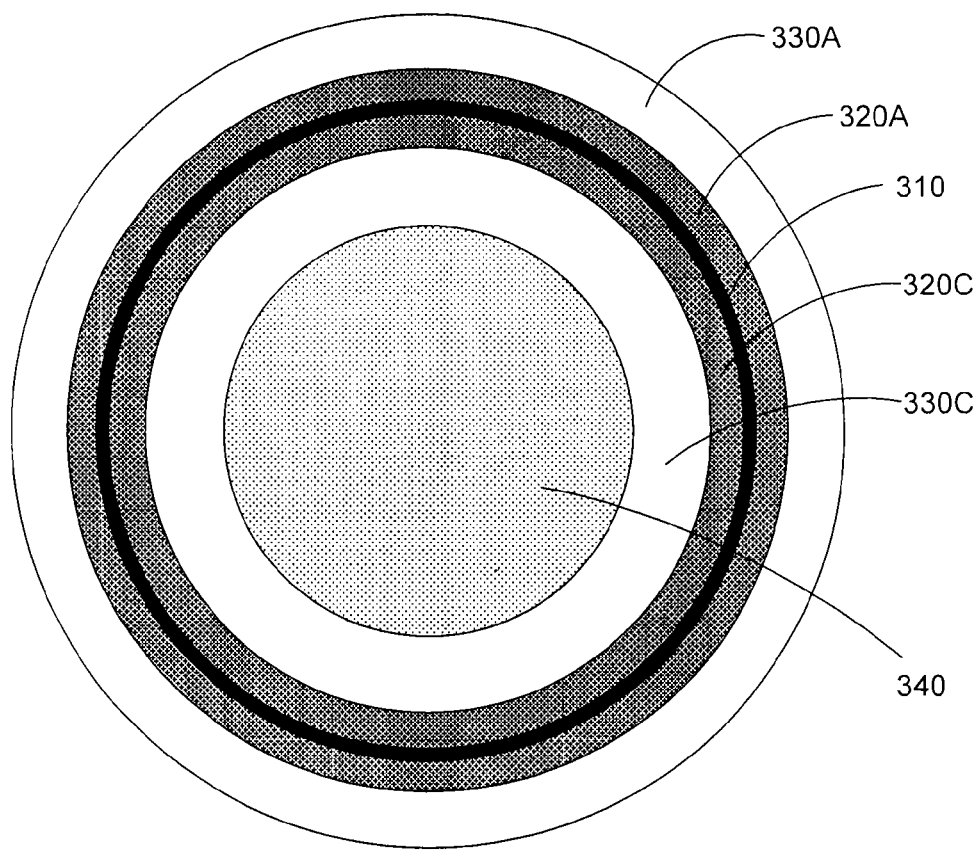
FIG. 3C depicts a cross-sectional view of a branch for the architecture of FIG. 3A.

However, assuming a concentric configuration (a variant of FIG. 1A), there will be an internal architecture as shown in FIG. 3C. FIG. 3C shows current collectors 320A and 320C separated by an insulative separator 310 with current collectors 330A and 330 respectively making contact with current collectors 320A and 320C. The central core 340 may be made of any number of insulative or conductive materials, or alternatively eliminated.

Figure 4:
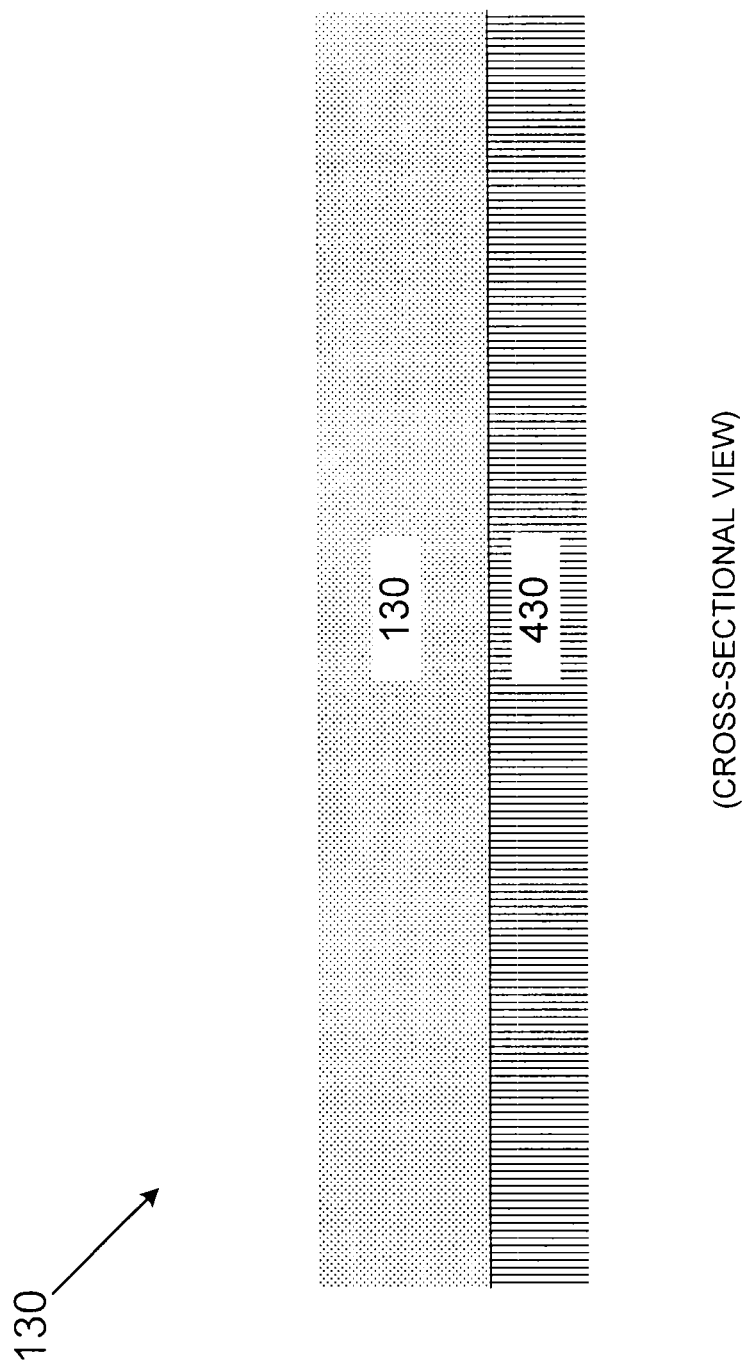
FIG. 4 depicts the surface of a metal conductor in contact with a matrix of carbon nanotubes.

FIG. 4 depicts the surface of a current collector 130, e.g., the current collector of FIGS. 3A-3B, or a flat and conductive sheet (per FIG. 1A), in electrical and physical contact with a matrix of carbon nanotubes 430. The individual carbon nanotubes are to be considered an extension of the current collector 130, and can merely make contact with the larger conductor or be mechanically attached such that one end/portion of a given nanotube is fastened to the current collector 130 while the majority of the nanotube's length is in electrical contact with an electrode thus providing even greater surface area contact and lower internal resistance. In effect, carbon nanotubes may form the smallest branches of a current collector.

Figure 5:
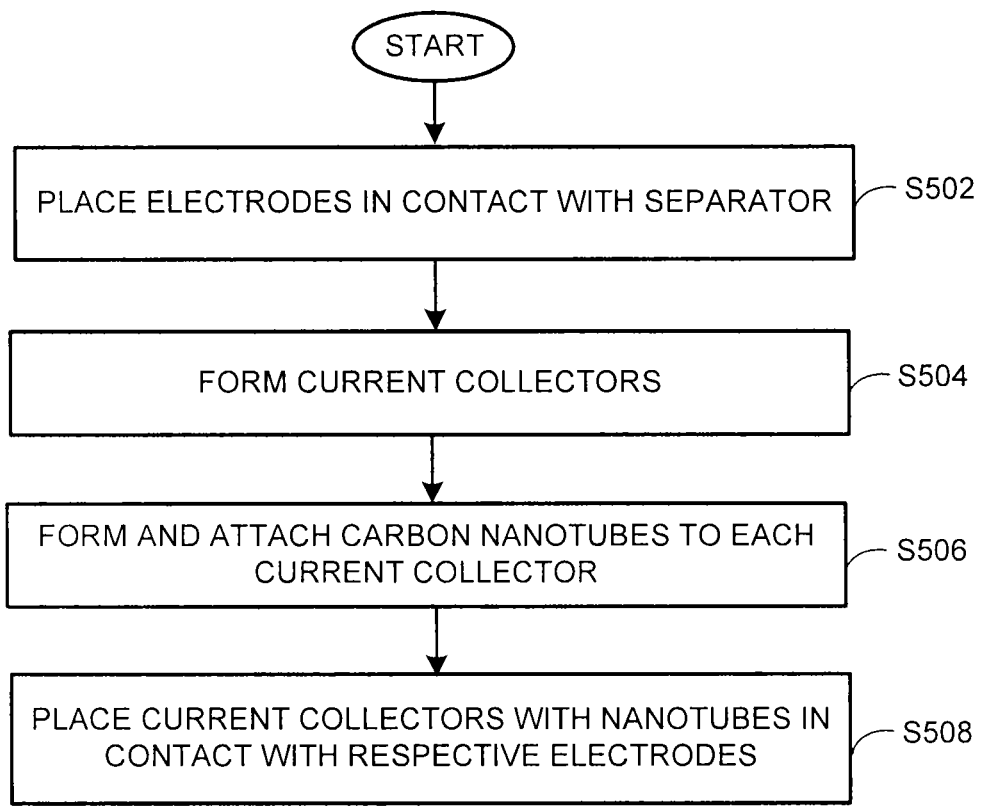
FIGS. 5 and 6 are flowcharts outlining two different operations for forming supercapacitors.

FIG. 5 is a flowchart outlining a set of operations for forming supercapacitors. It is to be appreciated to those skilled in the art in light of this disclosure that, while the various steps of FIG. 5 are shown according to a particular order for ease of explanation, that certain steps may be performed in different orders or in parallel.

The process starts in S502 where two electrodes, such as any of the highly-porous electrodes discussed above, are placed in contact with a separator. Next, in S504, current collectors, such as any of the various current collectors discussed above, including the flat sheet and branched architecture collectors. It is to be appreciated that a branched architecture collector can be formed in a variety of ways, such as by a metal sintering process to build the collector or by an etching process where a block of material is etched too form a branched topology. Tinier branches made of metal whiskers may be added or grown to achieve a fine layer of branches, and in S506 a matrix of carbon nanotubes is formed, made to contact and optionally attached to the current collector of S504 to form an even tinier layer of branches.

Figure 6:
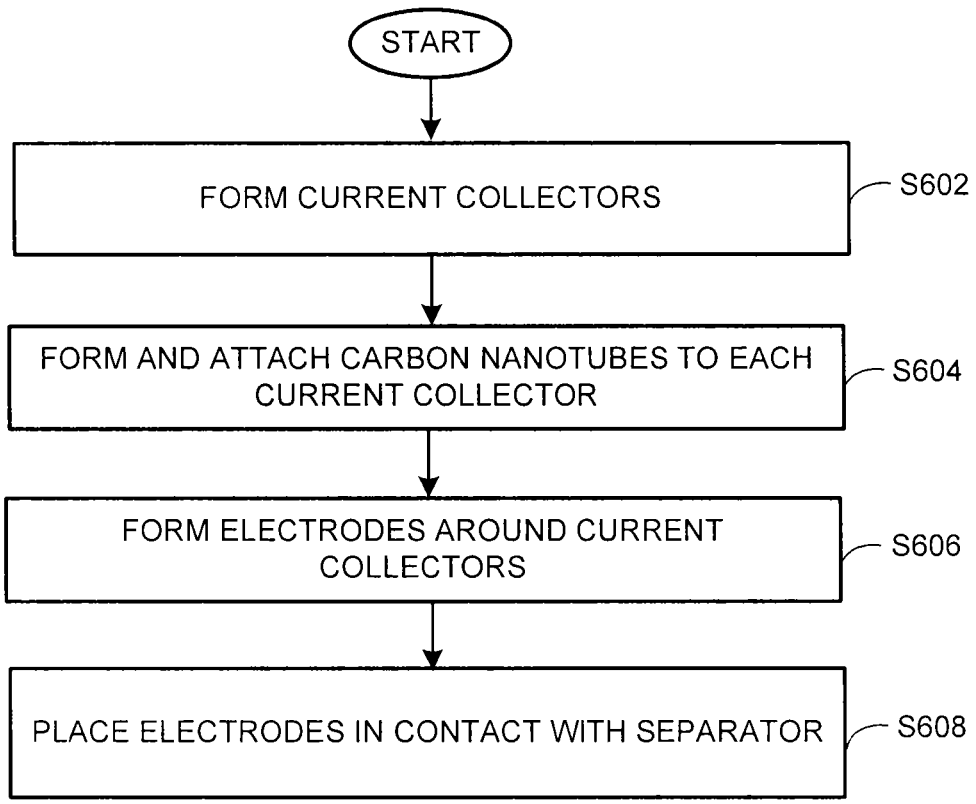

FIG. 6 is a flowchart outlining another set of operations for forming supercapacitors. Again, it is to be appreciated to those skilled in the art in light of this disclosure that, while the various steps of FIG. 6 are shown according to a particular order for ease of explanation, that certain steps may be performed in different orders or in parallel.

The process starts in S602 where current collectors are formed, such as any of the various current collectors discussed above, and in S604 a matrix of carbon nanotubes is formed, made to contact and optionally attached to the current collectors of S504 to form a structure having a very high surface area. Then in S606, supercapacitive electrodes, e.g., structures containing one or more highly-porous materials, are formed around the current collectors so as to achieve a high surface area contact between the current collectors and the electrodes. In S608 the electrodes with embedded current collectors are attached to opposite sides of a separator.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A supercapacitor, comprising:
   a first and second electrode with each electrode made at least in part from a highly-porous material;
   a insulative separator separating the electrodes; and
   a first electrically conductive current collector in physical and electrical contact with the first electrode; and
   a second electrically conductive current collector in physical and electrical contact with the second electrode;
   wherein at least one current collector includes a conductor and is configured to have multiple separate portions that are arranged in an interconnected branched topology of progressively smaller branches with each having a current capacity that varies as a function of current passing through during capacitive operation.

2. The supercapacitor of claim 1, wherein the multiple separate portions include a mesh of conductive carbon nanotubes in electrical contact with a metal conductor.

3. The supercapacitor of claim 2, wherein the conductive carbon nanotubes are mechanically attached to the metal conductor.

4. The supercapacitor of claim 3, wherein the first and second electrodes are made at least in part from a highly-porous carbonaceous material.

5. The supercapacitor of claim 3, wherein the metal conductor is a flat sheet.

6. The supercapacitor of claim 3, wherein the metal conductor is a generally flat sheet having a thickness that varies as a function of current passing through during capacitive operation.

7. The supercapacitor of claim 3, wherein the metal conductor has an interconnected branched topology of progressively smaller branches each having current capacity that varies as a function of current passing through during capacitive operation.

8. The supercapacitor of claim 1, wherein the at least one current collector includes a metal conductor, and wherein the metal conductor is a generally flat sheet having a thickness that varies as a function of current passing through during capacitive operation.

9. The supercapacitor of claim 1, wherein the at least one current collector includes a metal conductor.

10. The supercapacitor of claim 1, wherein the at least one current collector includes a conductor, and wherein the conductor is a generally flat sheet having a thickness that varies as a function of current passing through during capacitive operation.

11. A method for manufacturing a supercapacitor, the method comprising:
    placing or forming a first and second electrode in physical contact on opposite sides of a insulative separator such that the insulative separator electrically separates the electrodes, wherein each electrode made at least in part from a highly-porous material; and
    causing a first electrically conductive current collector to be in physical and electrical contact with the first electrode, and
    causing a second electrically conductive current collector to be in physical and electrical contact with the second electrode;
    wherein at least one current collector is configured to have multiple separate portions with each portion formed to have an interconnected branched topology of progressively smaller branches with each branch having a current capacity that varies as a function of current passing through during capacitive operation.

12. The method of claim 11, further comprising: forming the at least one current collector by forming or placing a mesh of conductive carbon nanotubes so as to be in electrical contact with a metal conductor.

13. The method of claim 12, wherein the conductive carbon nanotubes are mechanically attached to the metal conductor.

14. The method of claim 12, wherein the metal conductor is a flat sheet.

15. The method of claim 12, wherein the metal conductor is a generally flat sheet having a thickness that varies as a function of current passing through during capacitive operation.

16. The method of claim 11, further comprising forming the at least one current collector to a generally flat sheet having a thickness that varies as a function of current passing through during capacitive operation.

* * * * *